United States Patent
Praserthdam et al.

(10) Patent No.: US 8,617,657 B2
(45) Date of Patent: Dec. 31, 2013

(54) SMALL BLOCK COPOLYMER OF POLYIMIDE

(75) Inventors: Piyasan Praserthdam, Bangkok (TH); M. L. Supakanok Thongyai, Bangkok (TH); Sonti Khamsa-Nga, Pathumthani (TH)

(73) Assignee: Chulalongkorn University, Bangkok (TH)

( * ) Notice: Subject to any disclaimer, the term of this patent is extended or adjusted under 35 U.S.C. 154(b) by 732 days.

(21) Appl. No.: 12/198,263

(22) Filed: Aug. 26, 2008

(65) Prior Publication Data

US 2009/0061096 A1  Mar. 5, 2009

(30) Foreign Application Priority Data

Aug. 27, 2007  (TH) .............................. 0701004261

(51) Int. Cl.
  *B05D 3/10* (2006.01)
(52) U.S. Cl.
  USPC ................. 427/340; 427/331; 427/385.5
(58) Field of Classification Search
  USPC ............ 427/331, 340, 385.5; 528/21, 26, 38, 528/351, 353
  See application file for complete search history.

(56) References Cited

U.S. PATENT DOCUMENTS

| 4,389,504 | A | * | 6/1983 | St. Clair et al. | 524/233 |
| 4,670,565 | A | * | 6/1987 | Mikroyannidis et al. | 548/413 |
| 5,502,143 | A | * | 3/1996 | Oie et al. | 528/12 |
| 5,538,789 | A | * | 7/1996 | Capote et al. | 428/344 |
| 2002/0120091 | A1 | * | 8/2002 | Scott | 528/170 |
| 2002/0151234 | A1 | * | 10/2002 | Ozawa et al. | 442/50 |

* cited by examiner

*Primary Examiner* — Alexander Weddle
(74) *Attorney, Agent, or Firm* — Steven L. Nichols; Van Cott, Bagley, Cornwall & McCarthy P.C.

(57) ABSTRACT

A method of making a block polyimide copolymer containing a first small block copolymer segment and a second larger block segment includes the steps of (a) reacting a first aromatic acid dianhydride with an aromatic diamine in a molar ratio from about 10:100 to about 50:100, respectively, to obtain the small block copolymer, (b) reacting the small block copolymer and excess amount of diamine with a second acid dianhydride in such a quantity that a total aromatic acid dianhydride and a total aromatic diamine are equimolar to obtain a precursor solution containing the first small block copolymer segment and the second larger block segment, (c) forming a film, laminate, or coating on a substrate, and (d) cyclodehydrating the film, laminate, or coating by chemical or thermal imidization.

18 Claims, No Drawings

SMALL BLOCK COPOLYMER OF POLYIMIDE

RELATED APPLICATION

The present application corresponds to and claims the priority of Thai Patent Application No. 0701004261 filed on Aug. 27, 2007

BACKGROUND

Polyimide resins have outstanding thermal resistance and solvent stability, as well as good mechanical strength and tensile properties. They are used in a wide range of areas such as photographic films, insulation materials for electrical equipment, carrier tapes, and heat-insulating laminating materials in aircraft and spaceships. They are also used as the matrix resin in varnish, tape, adhesives and fiber reinforced composite materials.

Current research and development work attempts to create new types of polyimides that have advantages in addition to the known polyimide properties. In particular polyimide materials which can be used to make films having excellent adhesive properties to copper and other polyimides would be extremely useful in many high temperature applications. As an example, a block copolymer of copolyimide obtained by polycondensation of 3,3',4,4' Biphenyltetracarboxylic dianhydride (BPDA) and p-Phenylenediamine (PDA) is often employed in electronic parts used in applications needing high mechanical strength and resistance to high temperatures. However, its adhesive strength to copper or other polyimides, which are often used in electronics, is rather poor. This often results in the peeling of a copolyimide film and reduced life of an electronic part. Many patents have been issued relating to this kind of polyimide, but none of them have solved the problem of poor adhesive strength.

DETAILED DESCRIPTION

The present specification discloses methods and materials used to create block polyimide copolymers having high mechanical strength and good adhesion to a copper or polyimide substrate. In addition, the methods used have reduced complexity over prior methods. Films produced by the manner taught herein will find utility, for example, as a single film, a laminate on copper foil, or coating on various substrates including other polyimides.

The polyimides formed by the methods described herein are block copolyimides, meaning that the constituent polyimides which make up the resulting copolyimide are highly ordered within the material. The high order of the incorporated polymers results in an increased manifestation of the properties of the constituent polymers.

By choosing what polyimides will be used within the resulting polyimide, the resulting properties can be controlled. For example, a first polyimide may have high strength but low adhesion properties and a second polyimide may have low strength but high adhesion properties. By interspersing small blocks of the first polyimide throughout the second polyimide, both high strength and high adhesion properties may be achieved.

In the following description, for purposes of explanation, numerous specific details are set forth in order to provide a thorough understanding of the present systems and methods. It will be apparent, however, to one skilled in the art that the present systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

As previously mentioned, the present invention provides a polyimide copolymer having both high strength and high adhesion properties. These polymers comprise a first and second block polymer. The first block polymer is a small block copolymer of a polyimide which results from the mixing and reaction of an unbalanced concentration of a dianhydride and a diamine. The second block, which is intentionally attached to the first small block copolymer, comes from the reaction of an excess of diamine. The formed polymer is found to have high strength properties according to the second block polymer and be highly adhesive according to the first small block polymer.

The present invention also provides a simple method to prepare polymers of which the first and second blocks are made. The method comprises (1) dissolving an adequate amount of diamine (95-100 mole % equivalent), (2) adding and dissolving a solid form of a first dianhydride (10-50 mole % equivalent) and allowing the reaction to complete, (3) adding and dissolving a solid form of an adequate amount of a second dianhydride (50-90 mole % equivalent) to complete the condensation reaction and allowing the reaction to complete, and (4) curing the resulting copolymer obtained by using thermal or chemical imidization and/or removing the solvents. The polymer obtained in (3) may be applied to various substrates before performing step (4).

The block copolymer as prepared above comprises small block segments dispersed throughout a polymer and attached to larger block segments. The small block segments of polyimide come from a reaction of excess diamine to a small amount of dianhydride. An adequate amount of diamine (step 1 above) is equivalent to the amount of the first dianhydride (step 2 above) and the second dianhydride (step 3 above) combined. The first dianhydride portion is less than the second dianhydride portion in order to obtain the small size segments from the unbalanced concentration of the first dianhydride and diamine. The adequate amount of the second dianhydride is equivalent to the unbalanced portion from the reaction of the first dianhydride with the excess amine.

Throughout the specification chemical compounds are abbreviated as shown in Table 1 below.

TABLE 1

| Compound Abbreviations | |
| --- | --- |
| Reaction Component | |
| ODA | 4,4'-Oxydianiline |
| PDA | p-Phenylenediamine |
| PMDA | Pyromellitic dianhydride |
| BPDA | 3,3',4,4' Biphenyltetracarboxylic dianhydride |
| BTDA | 3,3',4,4' Benzophenonetetracarboxylic dianhydride |
| PA | Phthalic anhydride |
| Solvent | |
| NMP | N-methyl-2-Pyrrolidone |
| DMAc | N,N-dimethyl acetamine |
| DMF | N,N-dimethyl formamine |

Examples of diamine that can be used in the present invention include PDA or ODA. The use of PDA is preferred to increase the strength of the obtained polymer. Examples of a first dianhydride that can be used in the present invention include PMDA, BPDA or BTDA. The use of PMDA is preferred to increase the adhesion strength of the obtained polymer. Examples of a second dianhydride that can be used in the present invention include PMDA, BPDA or BTDA. The use of BPDA is preferred to increase the strength of the polymer.

The process for preparing the block copolyimide of the present invention comprises firstly forming of the small block copolyimide and secondly completing the reaction of the excess diamine with the second dianhydride to form the second block. In the first step, the 100 mole % equivalent diamine is dissolved in a non-reactive organic solvent followed by the reaction of the first dianhydride in the amount of 10-50 mole % equivalent to the diamine and stirred for one hour. In the second step, the second dianhydride of the amount of 50-90 mole % equivalent to the diamine is added and stirred for one hour to complete the reaction. The desired copolymer can be obtained by further imidization and the removal of the solvent. The sequence of the addition of the dianhydride is important in order to obtain the small size of the first block copolymer. No end chain component or preliminary imidization of the small size of the block copolymer is required. Compared to other processes, the present invention gave the maximum tensile strength and maximum adhesion to copper or other polyimide.

Examples of the solvent used in the present invention include NMP, DMAc, and DMF. These are preferred individually or in a combination. The polyamic acid obtained from the reaction was prepared in the portion of 10-30% by weight of the solvent. The solution of the polyamic acid obtained can be further applied to various substrates before imidization. The imidization process can be a chemical or thermal dehydration reaction.

In order to achieve the best strength and adhesion, the mole ratio of the first anhydride to the total amine is preferably 10 to 50 mole %, more preferably 20 to 40 mole %, still more preferably 27 to 33 mole %, and most preferably 30 mole %. The polyimide obtained will have the optimum between adhesion strength to the substrate and the tensile strength of the film. The most preferable first anhydride is PMDA and the most preferable second anhydride is BPDA. The most preferable diamine is PDA.

The present invention will now be described more specifically with reference to the following examples. It is to be noted that the following descriptions are examples of the present invention and are presented herein for purpose of illustration and description only. These examples are not intended to be exhaustive or to limit the present invention to the precise forms disclosed.

EXAMPLES

Examples 1-20 and Comparative examples 1-8 show preparation of copolyimide of aromatic polyamic acid solutions in film and copper clad form.

Example 1

A 25-ml Pyrex bottle and a stirrer bar were dried at 110° C. for 20 minutes to remove moisture. Then, all of the chemicals, Pyrex bottle, and stirrer bar were placed into a glove box with an argon gas environment. First, 0.32 g (2.99 mmol) of PDA, 0.196 g (0.89 mmol) of PMDA and 10.3 g of NMP were put into a Pyrex bottle and the resulting mixture was stirred for 2 hours. Then, 0.617 g (2.10 mmol) of BPDA was added to the bottle, and the resulting mixture was stirred at room temperature (28° C.) for an additional 2 hours. Thus, a homogeneous polyamic acid solution having a solid concentration of 10.9% by weight was prepared. This solution was defined as a precursor solution a.

For preparation of a film, a 2-mm thick glass slide produced by water evaporation was fixed in a stainless level frame. The precursor a was individually applied on a glass slide by means of a bar spatula to such a thickness that the resulting film had a thickness of 25 μm after thermal-curing. The applied precursor solution was then dried at 100° C. for fifty minutes. Then, the applied solutions was subjected to a heat treatment by increasing the temperature from 100° to 150° C. over twenty minutes, and then holding the temperature at 150° C. for one half hour. Then, the temperature was again increased from 150° to 300° C. over fifty minutes, followed by holding the temperature at 300° C. for one half hour, whereby the precursor were thermally cured to be imidized to form a film. The resulting film was peeled from the glass slide by water swelling. Thus, a polyimide film from precursor solution a was produced.

Example 2

The solution of Example 2 was prepared in a similar manner as described in Example 1 but the chemical amounts are different. First, 0.32 g (2.99 mmol) of PDA, 0.33 g (1.49 mmol) of PMDA and 10.3 g of NMP were put into a Pyrex bottle and the resulting mixture was stirred for 2 hours. Then, 0.44 g (1.49 mmol) of BPDA was added to the bottle, and the resulting mixture was stirred at room temperature (28° C.) for an additional 2 hours. Thus, a homogeneous polyamic acid solution having a solid concentration of 10.9% by weight was prepared. This solution was defined as precursor solution b.

A polyimide film from precursor solution b was produced in the same manner as described in Example 1.

Example 3

The solution of Example 3 was prepared in a similar manner as described in Example 1 but the order of chemical mixing is different. First, 0.32 g (2.99 mmol) of PDA, 0.44 g (1.49 mmol) of BPDA and 10.3 g of NMP were put into a Pyrex bottle and the resulting mixture was stirred for 2 hours. Then, 0.33 g (1.49 mmol) of PMDA was added to the bottle, and the resulting mixture was stirred at room temperature (28° C.) for an additional 2 hours. Thus, a homogeneous polyamic acid solution having a solid concentration of 10.9% by weight was prepared. This solution was defined as precursor solution c.

A polyimide film from precursor solution c was produced in the same manner as described in Example 1.

Example 4

The solution of Example 4 was prepared in a similar manner as described in Example 1 but the order of chemical mixing and chemical amounts differ. First, 0.33 g (1.49 mmol) of PMDA, 0.44 g (1.49 mmol) of BPDA and 10.3 g of NMP were put into a Pyrex bottle and the resulting mixture was stirred for 2 hours. Then, 0.32 g (2.99 mmol) of PDA was added to the bottle, and the resulting mixture was stirred at room temperature (28° C.) for an additional 2 hours. Thus, a homogeneous polyamic acid solution having a solid concentration of 10.9% by weight was prepared. This solution was defined as precursor solution d.

A polyimide film from precursor solution d was produced in the same manner as described in Example 1.

Example 5

The solution of Example 5 was prepared in a similar manner as described in Example 1 but the chemicals involved are different. This example made the small segments by using two amines rather than two anhydrides, as did previous examples. First, 0.16 g (1.49 mmol) of PDA, 10.3 g of NMP, 0.88 g (2.99 mmol) of BPDA were put into a Pyrex bottle and the resulting mixture was stirred for 2 hours. Then, 0.30 g (1.49 mmol) of ODA was added to the bottle, and the resulting mixture was stirred at room temperature (28° C.) for an additional 2 hours. Thus, a homogeneous polyamic acid solution having a solid concentration of 13.4% by weight was prepared. This solution was defined as precursor solution e.

A polyimide film from precursor solution e was produced in the same manner as described in Example 1.

Example 6

The solution of Example 6 was prepared in a similar manner as described in Example 5 but the order of chemical mixing is different. First, 0.30 g (1.49 mmol) of ODA, 10.3 g of NMP, 0.88 g (2.99 mmol) of BPDA were put into a Pyrex bottle and the resulting mixture was stirred for 2 hours. Then, 0.16 g (1.49 mmol) of PDA was added to the bottle, and the resulting mixture was stirred at room temperature (28° C.) for an additional 2 hours. Thus, a homogeneous polyamic acid solution having a solid concentration of 13.4% by weight was prepared. This solution was defined as precursor solution f.

A polyimide film from precursor solution f was produced in the same manner as described in Example 1.

Example 7

The solution of Example 7 was prepared in a similar manner as described in Example 5 but the order of chemical mixing is different. First, 0.30 g (1.49 mmol) of ODA, 0.16 g (1.49 mmol) of PDA and 10.3 g of NMP were put into a Pyrex bottle in an argon gas condition and the resulting mixture was stirred for 2 hours. Then, 0.88 g (2.99 mmol) of BPDA was added to the bottle, and the resulting mixture was stirred at room temperature (28° C.) for an additional 2 hours. Thus, a homogeneous polyamic acid solution having a solid concentration of 13.4% by weight was prepared. This solution was defined as precursor solution g.

A polyimide film from precursor solution g was produced in the same manner as described in Example 1.

Example 8

The solution of Example 8 was prepared in a similar manner as described in Example 1 but the materials used are different. Specifically, no PDA is used and BTDA is used rather than PMDA. This example illustrates that the present invention is not limited to the use of specific diamines or dianhydrides. First, 0.60 g (2.99 mmol) of ODA, 0.48 g (1.49 mmol) of BTDA, and 10.3 g of NMP were put into a Pyrex bottle and the resulting mixture was stirred for 2 hours. Then, 0.44 g (1.49 mmol) of BPDA was added to the bottle, and the resulting mixture was stirred at room temperature (28° C.) for an additional 2 hours. Thus, a homogeneous polyamic acid solution having a solid concentration of 10.9% by weight was prepared. This solution was defined as precursor solution h.

A polyimide film from precursor solution h was produced in the same manner as described in Example 1.

Example 9

The solution of Example 9 was prepared in a similar manner as described in Example 8 but the order of chemical mixing is different. First, 0.48 g (1.49 mmol) of BTDA, 0.44 g (1.49 mmol) of BPDA and 10.3 g of NMP were put into a Pyrex bottle and the resulting mixture was stirred for 2 hours. Then, 0.60 g (2.99 mmol) of ODA was added to the bottle, and the resulting mixture was stirred at room temperature (28° C.) for an additional 2 hours. Thus, a homogeneous polyamic acid solution having a solid concentration of 10.9% by weight was prepared. This solution was defined as precursor solution i.

A polyimide film from precursor solution i was produced in the same manner as described in Example 1.

Example 10

The solution of Example 10 was prepared in a similar manner as described in Example 8 but the order of chemical mixing is different. First, 0.60 g (2.99 mmol) of ODA, 0.44 g (1.49 mmol) of BPDA and 10.3 g of NMP were put into a Pyrex bottle and the resulting mixture was stirred for 2 hours. Then, 0.48 g (1.49 mmol) of BTDA was added to the bottle, and the resulting mixture was stirred at room temperature (28° C.) for an additional 2 hours. Thus, a homogeneous polyamic acid solution having a solid concentration of 15.2% by weight was prepared. This solution was defined as precursor solution j.

A polyimide film from precursor solution j was produced in the same manner as described in Example 1.

Comparative Example 1

This comparative example used ODA instead of PDA and has the mono-functional PA involved in the reaction. The mixing method of five materials aimed to create the interpenetration network of two different anhydrides. First, 0.6 g (2.99 mmol) of ODA, 0.65 g (2.98 mmol) of PMDA and 8.24 g of NMP were put into a Pyrex bottle and the resulting mixture was stirred for 2 hours. Then, 0.000211 g (0.01 mmol) of PA, 0.597 g (2.98 mmol) of ODA in 7.21 g of NMP and 0.877 g (2.98 mmol) of BPDA were sequentially added to the bottle, and the resulting mixture was stirred at room temperature (28° C.) for an additional 2 hours. Thus, a homogeneous polyamic acid solution having a solid concentration of 18.2% by weight was prepared. This solution was defined as precursor solution k.

A polyimide film from precursor solution k was produced in the same manner as described in Example 1.

Comparative Example 2

The solution of Comparative Example 2 was prepared in a similar manner as described in Comparative Example 1 but the PA was omitted. The mixing method of four materials aimed to create the long chain block copolymer from two different anhydrides. First, 0.6 g (2.99 mmol) of ODA, 0.654 g (2.99 mmol) of PMDA and 8.24 g of NMP were put into a Pyrex bottle and the resulting mixture was stirred for 2 hours. Then, 0.597 g (2.98 mmol) of ODA in 7.21 g of NMP and 0.877 g (2.98 mmol) of BPDA were sequentially added to the bottle, and the resulting mixture was stirred at room temperature (28° C.) for an additional 2 hours. Thus, a homogeneous polyamic acid solution having a solid concentration of 18.2% by weight was prepared. This solution was defined as precursor solution l.

A polyimide film from precursor solution l was produced in the same manner as described in Example 1.

Comparative Example 3

The solution of Comparative Example 3 was prepared in a similar manner as described in Comparative Example 1 but used PDA instead of ODA in order to compare the effects caused by the type of diamine used. The mixing of five materials aimed to create the interpenetration network of two different anhydrides. First, 0.195 g (1.80 mmol) of PDA, 0.39 g (1.79 mmol) of PMDA and 8.24 g of NMP were put into a Pyrex bottle and the resulting mixture was stirred for 2 hours. Then, 0.000211 g (0.01 mmol) of PA, 0.194 g (1.79 mmol) of PDA in 7.21 g of NMP and 0.528 g (1.79 mmol) of BPDA were sequentially added to the bottle, and the resulting mixture was stirred at room temperature (28° C.) for an additional 2 hours. Thus, a homogeneous polyamic acid solution having a solid concentration of 18.2% by weight was prepared. This solution was defined as precursor solution m.

A polyimide film from precursor solution m was produced in the same manner as described in Example 1.

Comparative Example 4

The solution of Comparative Example 4 was prepared in a similar manner as described in Comparative Example 3 but omitted the PA. The mixing method of four materials aimed to create the long chain block copolymer from two different anhydrides. First, 0.195 g (1.79 mmol) of PDA, 0.39 g (1.79 mmol) of PMDA and 8.24 g of NMP were put into a Pyrex bottle and the resulting mixture was stirred for 2 hours. Then, 0.194 g (1.79 mmol) of PDA in 7.21 g of NMP and 0.528 g (1.79 mmol) of BPDA were sequentially added to the bottle, and the resulting mixture was stirred at room temperature (28° C.) for an additional 2 hours. Thus, a homogeneous polyamic acid solution having a solid concentration of 18.2% by weight was prepared. This solution was defined as precursor solution n A polyimide film from precursor solution n was produced in the same manner as described in Example 1.

The tensile strength properties of the polyimide films obtained in examples 1-10 and comparative examples 1-4 were determined using the ASTM D882 testing standard. The results are shown in Table 2.

To determine the tensile strength properties test specimens having a length of 10 cm and a width of 2 cm were dried at 110° C. for 10 minutes, after which the tensile strength of each polyimide film was measured. A symbol X indicates that the tensile strength of film was smaller than 120 MPa, a symbol Δ indicates that the tensile strength was smaller than 160 MPa and not smaller than 120 MPa, a symbol □ indicates that the tensile strength was smaller than 200 MPa and not smaller than 160 MPa, a symbol # indicates that the tensile strength was smaller than 240 MPa and not smaller than 200 MPa, a symbol @ indicates that the tensile strength was larger than 240 MPa.

TABLE 1

| Example | Tensile Strength | Mixing Order | | | | |
|---|---|---|---|---|---|---|
| | | First | Second | Third | Fourth | fifth |
| 1 | @ | PDA (2.99) | PMDA (0.89) | BPDA (2.1) | — | — |
| 2 | # | PDA (2.99) | PMDA (1.49) | BPDA (1.49) | — | — |
| 3 | □ | PDA (2.99) | BPDA (1.49) | PMDA (1.49) | — | — |
| 4 | □ | PMDA (1.49) | BPDA (1.49) | PDA (2.99) | — | — |
| 5 | □ | PDA (1.49) | BPDA (2.99) | ODA (1.49) | — | — |
| 6 | □ | ODA (1.49) | BPDA (2.99) | PDA (1.49) | — | — |
| 7 | □ | ODA (1.49) | PDA (1.49) | BPDA (2.99) | — | — |
| 8 | Δ | ODA (2.99) | BTDA (1.49) | BPDA (1.49) | — | — |
| 9 | Δ | BTDA (1.49) | BPDA (1.49) | ODA (2.99) | — | — |
| 10 | Δ | ODA (2.99) | BPDA (1.49) | BTDA (1.49) | — | — |
| Comparative Example | | | | | | |
| 1 | Δ | ODA (2.99) | PMDA (2.98) | PA (0.01) | ODA (2.98) | BPDA (2.98) |
| 2 | X | ODA (2.99) | PMDA (2.99) | ODA (2.98) | BPDA (2.98) | — |
| 3 | Δ | PDA (1.8) | PMDA (1.79) | PA (0.01) | PDA (1.79) | BPDA (1.79) |
| 4 | X | PDA (1.79) | PMDA (1.79) | PDA (1.79) | BPDA (1.79) | — |

Examples 11-20

For examples 11-20, 50-μm thick Cu-sheets produced by surface treatment were fixed in a stainless level frame. The precursor a-j were individually applied on the Cu-sheet by means of a bar spatula to such a thickness that the resulting film had a thickness of 25 μm after thermal-curing. The laminated Cu-Sheets were then dried to 100° C. for fifty minutes. Then, the laminated Cu-Sheets were subjected to a heat treatment by increasing the temperature from 100° to 150° C. over twenty minutes and then holding the temperature at 150° C. for one half hour. Then, increasing the temperature from 150° to 300° C. over fifty minutes and then holding the temperature at 300° C. for another half hour, whereby the precursors were thermally cured and imidized to form coats on the Cu films. Thus, examples 11-20 were formed by coating Cu sheets clad with, respectively, precursors a-j.

Comparative Examples 5-8

The coated Cu sheets were prepared in the same manner as described in Examples 11-20 using, respectively, the precursor solutions k-n. Thus, coated Cu sheets clad with precursors k-n were individually produced.

The adhesion properties of the coated Cu films obtained in Examples 11-20 and Comparative Examples 5-8 were determined using the ASTM D5179-02 testing standard. The results are shown in Table 3.

For the determination of the adhesion properties, test specimens having a length of 3 cm and a width of 3 cm were cleaned and dried at 110° C. for 10 minutes, and the maximum stress of the polyimide films were measured. A symbol X indicates that the maximum stress of film was smaller than 10 MPa, a symbol Δ indicates that the maximum stress was smaller than 15 Mpa and not smaller than 10 Mpa, a symbol ☐ indicates that the maximum stress was smaller than 15 Mpa and not smaller than 20 Mpa, a symbol # indicates that the maximum stress was larger than 20 Mpa.

TABLE 2

Adhesion

| Example | Adhesion Properties |
|---|---|
| 11 | # |
| 12 | ☐ |
| 13 | Δ |
| 14 | Δ |
| 15 | X |
| 16 | X |
| 17 | X |
| 18 | Δ |
| 19 | X |
| 20 | Δ |
| Comparative Example | |
| 5 | Δ |
| 6 | Δ |
| 7 | Δ |
| 8 | Δ |

What is claimed is:

1. A method of making a block polyimide copolymer containing a first small block copolymer segment, the first small block copolymer segment having a molecular weight of up to 1000 grams/mol, and a second larger block segment, the method comprising:
   (a) reacting a first aromatic acid dianhydride with an aromatic diamine in a molar ratio from about 10:100 to about 33:100 respectively with an excess amount of diamine to obtain said small block copolymer segments having a molecular weight of up to 1000 grams/mol of said first aromatic dianhydride with an amine end chain and an excess amount of diamine;
   (b) reacting said small block copolymer and said excess amount of diamine with a second acid dianhydride in such a quantity that a total aromatic acid dianhydride and a total aromatic diamine are equimolar to obtain a precursor solution containing said first small block copolymer segment and said second larger block segment;
   (c) forming a film, laminate or coating on a substrate from said precursor solution at room temperature by using solvent; and
   (d) cyclodehydrating said film, laminate, or coating on said substrate by imidization to obtain said block polyimide copolymer film;
   in which the block polyimide copolymer has a tensile strength greater than 120 megapascals (MPa) and a pull strength on said substrate greater than 10 megapascals (MPa).

2. The method of claim 1, wherein said molar ratio of said first aromatic acid dianhydride to said aromatic diamine is 30:100, and in which the block polyimide copolymer has a tensile strength on said substrate greater than 240 megapascals (MPa) and a pull strength greater than 20 megapascals (MPa).

3. The method of claim 1, wherein said imidization is done by chemical imidization.

4. The method of claim 1, wherein said imidization is done by thermal imidization.

5. The method of claim 1, wherein said block polyimide copolymer is between about 50-90 mole % second segment and between about 10-50 mole % first segment.

6. The method of claim 1, wherein said first aromatic dianhydride is one of Pyromellitic dianhydride (PMDA) and 3,3',4,4' Benzophenone tetracarboxylic dianhydride (BTDA) and said second aromatic dianhydride is one of 3,3',4,4' Biphenyltetracarboxylic dianhydride (BPDA) and Benzophenonetetracarboxylic dianhydride (BTDA).

7. The method of claim 1, wherein said diamine is one of p-Phenylenediamine (p-PDA) and 4,4'-Oxydianiline (ODA).

8. The method of claim 1, wherein (a) to (c) are carried in a polar solvent comprising one or more of N-methyl-2-Pyrrolidone (NMP), N,N-dimethyl acetamide (DMAc), and N,N-dimethyl formamide (DMF).

9. The method of claim 1, wherein thermal imidization is carried out at about 300° C. or above.

10. The method of claim 1, wherein chemical imidization is carried out by a cyclization catalyst and a dehydration agent.

11. A block polyimide copolymer containing a small block copolymer segment, the first small block copolymer segment having a molecular weight of up to 1000 grams/mol, and a second larger block segment produced according to the method of claim 1.

12. The method of claim 1, in which reacting said small block copolymer and said excess amount of diamine with a second acid dianhydride is done with an additive.

13. The method of claim 1, in which reacting said small block copolymer and said excess amount of diamine with a second acid dianhydride is done with or without an additive.

14. A method of making a block polyimide copolymer containing a first small block copolymer segment, the first small block copolymer segment having a molecular weight of up to 1000 grams/mol, and a second larger block segment, the method comprising:
   (a) reacting, at room temperature, a first aromatic acid dianhydride with an aromatic diamine in a molar ratio from about 10:100 to about 33:100 respectively to obtain said small block copolymer of said first aromatic dianhydride with an amine end chain and an excess amount of diamine;
   (b) reacting, at room temperature, said small block copolymer and said excess amount of diamine with a second acid dianhydride in such a quantity that a total aromatic acid dianhydride and a total aromatic diamine are equimolar to obtain a precursor solution containing said first small block copolymer segment and said second larger block segment;
   (c) forming a film, laminate or coating on a substrate on a substrate from said precursor solution at room temperature by using a solvent; and
   (d) cyclodehydrating said film on said substrate by imidization to obtain said block polyimide copolymer film;
   in which the block polyimide copolymer has a tensile strength greater than 120 megapascals (MPa) and a pull strength on said substrate greater than 10 megapascals (MPa).

15. The method of claim 14, in which reacting said small block copolymer and said excess amount of diamine with a second acid dianhydride is done without an additive.

16. The method of claim 14, wherein said first aromatic dianhydride is one of Pyromellitic dianhydride (PMDA) 3,3', 4,4' Biphenyltetracarboxylic dianhydride (BPDA), and 3,3', 4,4' Benzophenone tetracarboxylic dianhydride (BTDA) and said second aromatic dianhydride is one of 3,3',4,4' Biphenyltetracarboxylic dianhydride (BPDA) and Benzophenonetetracarboxylic dianhydride (BTDA).

17. A method of making a block polyimide copolymer containing a first small block copolymer segment, the first small block copolymer segment having a molecular weight of up to 1000 grams/mol, and a second larger block segment, the method comprising:
(a) reacting, at room temperature, a first aromatic acid dianhydride with an aromatic diamine in a molar ratio of about 30:100 respectively to obtain said small block copolymer of said first aromatic dianhydride with an amine end chain and an excess amount of diamine;
(b) reacting, at room temperature, said small block copolymer and said excess amount of diamine with a second acid dianhydride in such a quantity that a total aromatic acid dianhydride and a total aromatic diamine are equimolar to obtain a precursor solution containing said first small block copolymer segment and said second larger block segment;
(c) forming a liquid film, laminate or coating on a substrate on a substrate from said precursor solution at room temperature by using solvent; and
(d) cyclodehydrating said film on said substrate by imidization to obtain said block polyimide copolymer film;
in which the block polyimide copolymer has a tensile strength on said substrate greater than 200 megapascals (MPa) and a pull strength greater than 15 megapascals (MPa).

18. The method of claim 17, wherein said first aromatic dianhydride is one of Pyromellitic dianhydride (PMDA), 3,3', 4,4' Benzophenone tetracarboxylic dianhydride (BTDA), and 3,3',4,4' Biphenyltetracarboxylic dianhydride (BPDA) and said second aromatic dianhydride is one of 3,3',4,4' Biphenyltetracarboxylic dianhydride (BPDA) and Benzophenonetetracarboxylic dianhydride (BTDA).

* * * * *